US006976034B1

(12) United States Patent
Melick et al.

(10) Patent No.: US 6,976,034 B1
(45) Date of Patent: *Dec. 13, 2005

(54) METHOD OF TRANSMITTING DATA INCLUDING A STRUCTURED LINEAR DATABASE

(75) Inventors: Bruce D. Melick, Cedar Rapids, IA (US); David M. Snyder, Cedar Rapids, IA (US); Leslie D. Baych, Cedar Rapids, IA (US)

(73) Assignee: Lightwaves Systems, Inc., Cedar Rapids, IA (US)

( * ) Notice: Subject to any disclaimer, the term of this patent is extended or adjusted under 35 U.S.C. 154(b) by 240 days.

This patent is subject to a terminal disclaimer.

(21) Appl. No.: 10/602,125

(22) Filed: Jun. 23, 2003

Related U.S. Application Data (62) Division of application No. 09/698,793, filed on Oct. 27, 2000, now Pat. No. 6,868,419.

(60) Provisional application No. 60/220,749, filed on Jul. 26, 2000, provisional application No. 60/163,426, filed on Nov. 3, 1999, provisional application No. 60/162,094, filed on Oct. 28, 1999.

(51) Int. Cl.[7] ............................................. G06F 17/30
(52) U.S. Cl. .................... 707/104.1; 707/102
(58) Field of Search .............................. 707/3, 10, 100, 707/104.1; 709/231, 236; 370/470, 472, 370/428; 375/369; 360/39, 40; 342/202

(56) References Cited

U.S. PATENT DOCUMENTS

| 4,357,634 A | 11/1982 | Chung ........................ 360/40 |
| 4,434,323 A | 2/1984 | Levine et al. ................ 380/260 |
| 4,513,403 A | 4/1985 | Troy ............................. 367/83 |
| 4,641,317 A | 2/1987 | Fullerton ..................... 375/130 |
| 4,706,264 A | 11/1987 | Cung ........................... 375/240 |
| 4,813,057 A | 3/1989 | Fullerton ..................... 375/259 |
| 5,339,421 A | 8/1994 | Housel, III .................. 719/328 |
| 5,363,108 A | 11/1994 | Fullerton ..................... 342/27 |
| 5,497,373 A | 3/1996 | Hulen et al. ................. 370/259 |
| 5,560,038 A | 9/1996 | Haddock ..................... 709/236 |
| 5,581,706 A * | 12/1996 | Jessup et al. ............. 707/104.1 |
| 5,677,927 A | 10/1997 | Fullerton et al. ........... 375/130 |
| 5,706,495 A | 1/1998 | Chadha et al. ................ 707/2 |
| 5,754,849 A | 5/1998 | Dyer et al. .................. 707/101 |
| 5,818,442 A | 10/1998 | Adamson ..................... 715/753 |

(Continued)

OTHER PUBLICATIONS

Win et al., Jun. 1997, "Ultra-Wide Bandwidth Signal Propagation for Indoor Wireless Communication", IEEE International Conference on Communications—Montreal, Canada, pp. 56-60.

(Continued)

*Primary Examiner*—Apu M. Mofiz
(74) *Attorney, Agent, or Firm*—McKee, Voorhees & Sease, P.L.C.

(57) ABSTRACT

A method, system and type of database for transmitting data is disclosed in which the data is organized into a structured linear database. The structured linear database includes a routing header portion, a file allocation table, a data portion and a tailbit portion. The structured linear database may be transmitted over any type of network, such as a TM-UWB system or a fiber-optic system. Once the data to be transmitted is identified, a corresponding field is identified in the field allocation table giving the location of the data within the transmission. This field is then referenced by the user to access the specific type of data desired at the given location of the transmission. this process may be repeated enabling data to be stored on transmission lines and accessed at any point at any time providing an always on network.

17 Claims, 1 Drawing Sheet

U.S. PATENT DOCUMENTS

| | | | | |
|---|---|---|---|---|
| 5,832,035 | A | 11/1998 | Fullerton | 375/149 |
| 5,841,764 | A | 11/1998 | Roderique et al. | 370/310 |
| 5,852,825 | A | 12/1998 | Winslow | 707/6 |
| 5,951,646 | A | 9/1999 | Brandon | 709/231 |
| 5,952,956 | A | 9/1999 | Fullerton | 342/27 |
| 6,031,862 | A | 2/2000 | Fullerton et al. | 375/146 |
| 6,049,848 | A | 4/2000 | Yates et al. | 711/4 |
| 6,061,057 | A | 5/2000 | Knowlton et al. | 715/744 |
| 6,112,207 | A | 8/2000 | Nori et al. | 707/101 |
| 6,151,602 | A | 11/2000 | Hejlsberg et al. | 707/10 |
| 6,250,309 | B1 | 6/2001 | Krichen et al. | 128/899 |
| 6,354,946 | B1 | 3/2002 | Finn | 463/40 |
| 6,356,946 | B1 | 3/2002 | Clegg et al. | 709/231 |
| 6,363,320 | B1 | 3/2002 | Chou | 701/207 |
| 6,427,150 | B1 | 7/2002 | Oashi et al. | 307/10 |
| 6,438,140 | B1 | 8/2002 | Jungers et al. | 370/431 |
| 6,496,104 | B2 | 12/2002 | Kline | 340/310.01 |
| 6,781,530 | B2 | 8/2004 | Moore | 385/147 |
| 6,782,048 | B2 | 8/2004 | Santhoff | 375/240 |
| 6,868,419 | B1 * | 3/2005 | Melick et al. | 707/100 |
| 2001/0015965 | A1 | 8/2001 | Preston | 370/338 |
| 2001/0053175 | A1 | 12/2001 | Hoctor | 375/130 |
| 2002/0016905 | A1 | 2/2002 | Kojima | 712/36 |
| 2002/0018514 | A1 | 2/2002 | Haynes | 375/130 |
| 2002/0059642 | A1 | 5/2002 | Russ | 725/135 |
| 2002/0075972 | A1 | 6/2002 | Richards | 375/324 |
| 2002/0076193 | A1 | 6/2002 | Melick | 385/147 |
| 2002/0089423 | A1 | 7/2002 | Przygoda | 340/540 |
| 2002/0097790 | A1 | 7/2002 | Dress | 375/219 |
| 2002/0172291 | A1 | 11/2002 | Maggio | 375/259 |
| 2002/0190786 | A1 | 12/2002 | Yoon | 329/313 |
| 2003/0076248 | A1 | 4/2003 | Larson | 341/104 |
| 2003/0093567 | A1 | 5/2003 | Lolayekar | 709/246 |
| 2003/0095063 | A1 | 5/2003 | Fullerton | 342/118 |
| 2003/0095609 | A1 | 5/2003 | Cowie | 375/316 |

OTHER PUBLICATIONS

Maney Apr. 9, 1999, "Pulsing with Promise", USA Today.

Win et al., Jan. 1998, "Impulse Radio: How it works", IEEE Communications Letters, vol. 2, No. 1, pp. 10-12.

"Universal Data Tone", http://www.emc.com/about/data_tone/index.jsp.

Ruettgers, "Thriving in the Information Economy", http://www.emc.com/about/amandgement/speeches/wired_index.jsp.

Ruettgers, "E-Infostructure: EMC'S Vision for Accelerating the New Economy", http//www.emc.com/about/managment/speeches/cebit.jsp.

WO 01/97477 by Roberts et al. "Method for Specifying Pulse Characteristics Using Codes" Dec. 2001.

Pulse-Link, Inc., San Diego, CA, "Ultra Wideband Over Cable Technologies: Enhancing Cable Television Bandwidth Capacity Without Modification to Existing Infrastructure" (2002).

* cited by examiner

FIG. 1

METHOD OF TRANSMITTING DATA INCLUDING A STRUCTURED LINEAR DATABASE

This application is a divisional of U.S. patent application Ser. No. 09/698,793 filed on Oct. 27, 2000 now U.S. Pat. No. 6,868,419 which is a conversion of and claims priority to prior United States Provisional Patent Applications, Ser. No. 60/162,094 filed Oct. 28, 1999, 60/163,426 filed Nov. 3, 1999, and 60/220,749 filed Jul. 26, 2000, all of which are entitled Structured Linear Databases and are herein incorporated by reference.

BACKGROUND OF THE INVENTION

1. Field of the Invention

The present invention relates generally to the formatting of data into a database to create a structured linear database which may be transmitted and received. More particularly, although not exclusively, the present invention relates to a structured linear database and method for creation thereof based upon the formatting of time modulated ultra wide band repeating complex coded pulses in order to provide a common platform for simultaneous transmission and/or storage of streaming and non-streaming data. The present invention is designed to provide universal data interchange across different operating systems and software applications.

2. Problems in the Art

Currently, information can be accessed through a variety of media such as the Internet, radio, telephone, and television. Each of these media however uses a different device in technology to deliver the information. As an increasing amount of information becomes digital, different devices are capable of accessing the same information. For example, an Internet webpage can be accessed from a computer, a television, and cell phones. Yet our society depends largely only on computers to store and manipulate data. In order to do this, computers use a variety of operating systems, application software, telecommunication protocols and storage mediums. There is therefore a need to provide a method of transmitting data which may be easily understood by any form of communication. There is also a need for a structured transmission platform which provides for the simultaneous transmission of streaming and non-streaming data.

This has forced the telecommunication industry to develop an interconnected variety of networks to provide all of the various services. A variety of methods exists to accomplish this goal, such as the copper based hard-wire network, microwave relays, satellite relays, fiberoptic based hard-wire networks and radio telephony. However, fiberoptic based networks are fast becoming the de facto standard for the hard-wire portion of the telecommunications system. These fiberoptic networks provide a high speed, high volume medium for the telecommunication of radio, voice, t.v., and data signals both locally and globally. Further, recent advances in the ability to code information on to more discrete colors of light are increasing the capacity of existing fiberoptic networks by orders of magnitude. An almost infinite number of wavelengths of light could pass through a fiberoptic cable, making data flow literally "at the speed of light." The need to telecommunicate Internet, radio, voice, t.v., and other data is driving the demand for a higher capacity in the fiberoptic telecommunications network.

However, the current costs of bringing fiberoptics the "last mile" to a home or business is very high. In addition, consumers want the ability to access data on the move. Current wireless systems cannot address both the "last mile" need and the need to access data on the move. Some such systems are simply not compatible with the security and speed of fiberoptics. Others, such as micro-wave systems, are not practical for residential or small business applications, and are not compatible with mobile users because direct line of sight between the user and tower is required. There is therefore a need for a wireless system that overcomes the "last mile" problem, is compatible with the speed and security of fiberoptics, and can be used globally by mobile users.

In departing radically from traditional wireless radio techniques, impulse radio or time modulation is a recent innovation in radio signal transmissions. Time Domain, Inc. has developed a impulse radio system which incorporates time modulated, ultra wide band technology (TM-UWB). Impulse radio systems are described in a series of patents, including U.S. Pat. Nos. 5,952,956 and 5,363,108 to Fullerton et al., and U.S. Pat. Nos. 5,832,035; 5,812,081; and 5,677,927 all to Fullerton. These patents are herein incorporated by reference.

A TM-UWB system places individual pulses at very precise, repeatable time intervals and transmits the pulses across a ultra wide band spectrum. These digital pulses are low power, produce noise-like signals, are self-identified by their timing sequence, and are capable of having data injected on to the timing sequence. This pulse technology allows for secured transmission of data, video, and voice at extremely high-speed transmission rates.

Historically however, the only way to transmit radio signals such as voice, music, t.v., and other data has been via continuously oscillating radio waves. Digital pulse technology uses impulse transmitters to emit ultra short Gaussian monocycle pulses with a tightly controlled pulse to pulse interval instead of radio waves. IBM Microelectronics Corporation has developed two proprietary chips which are fabricated from advanced silicon germanium for use in TM-UWB transmitters and receivers. This semiconductor material has allowed the chip to precisely control pulsation timing and correlation to within a few pico-seconds. New chips are being developed to precisely control pulsation timing to correlation to within a few femto-seconds. This would represent up to a 1,000 times increase in relative speed of data that would be transmitted per second over the current pico-second chips.

Further, these monocycles are resistant to multi-path fading and provide extremely high data transmission rates. Each digital pulse has a neutral position or can represent a one or a zero, and is not frequency dependent, and therefore may be transmitted across an ultra-wide spectrum. TM-UWB pulse technology offers a viable solution to data transmission because it does not compete with the currently crowded radio wave spectrums. This technology also provides a large number of operational capabilities beyond traditional oscillating radio wave transmission systems. A basic discussion of impulse radio and how it works can be referenced in an article entitled "Impulse Radio Wave: How It Works" published by IEEE Communications Letters, Volume 2, No. 2, February, 1998. This article specifically explains the rationale for impulse radio technology, and the ability to employ this technology to solve many of the different problems encountered using wireless transmissions indoors. Additional discussions of the robustness of TM-UWB signal use can be referenced in an article entitled "Ultra-Wide Band With Signal Propagation for Indoor Wireless Communications" published in June, 1997, from the IEEE International Conference on Communications, Montreal, Canada. All of these articles are herein incorporated by reference.

One of the great beneficial characteristics of TM-UWB technology is security. Due to the astounding number of possible combinations of timing sequences, it is statistically impossible to decode this type of information transmission unless the required complex code is used both by transmitting and receiving devices. Another by-product of the tremendous number of combinations is the unlikely chance for signal interference. The signals are so random and low powered that they are indistinguishable from background noise. Another beneficial characteristic of the combination is that it operates at very low power spectral densities and does not need a power amplifier for signal transmissions. TM-UWB systems will consume substantially less power than existing conventional radios. Further, hardware needed for such systems is relatively simple to manufacture and at substantially less cost than what is currently required to build spread spectrum radios and related equipment.

There is therefore a need for a system based upon TM-UWB repeating complex coded pulses that provides a common platform for universal data interchange between different computer operating systems, software applications, and electronic devices, is a combined protocol for transmission and data storage, and is further capable of being transmitted wirelessly on a telecommunications network at very high speeds with great security.

FEATURES OF THE INVENTION

A general feature of the present invention is the provision of a structured linear database which overcomes the problems in the prior art.

A further feature of the present invention is to provide structure to time modulated ultra wide band repeating, complex, coded pulses to create a linear database.

Another feature of the present invention to provide a structured linear database for use as a single carrier for simultaneous transmission of streaming and non-streaming data.

A still further feature of the present invention is to provide a common platform for computers, PDAs, and other devices to interchange streaming and non-streaming data across any operating system or software application by identifying the type of structured linear database that is being accessed.

Another feature of the present invention is to utilize TM-UWB impulse radio networks to telecommunicate streaming data using a structured linear database.

Another feature of the present invention is to utilize TM-UWB impulse radio networks to telecommunicate non-streaming data using a structured linear database.

Another feature of the present invention is to utilize fiber optic networks to telecommunicate streaming data using a structured linear database.

Another feature of the present invention is to utilize fiber optic networks to telecommunicate non-streaming data using a structured linear database.

A still further feature of the present invention is to utilize traditional radio frequency networks to telecommunicate streaming data using a structured linear database.

Another feature of the present invention is to utilize traditional radio frequency networks to telecommunicate non-streaming data using a structured linear database.

Another feature of the present invention is the provision of providing structure to streaming data in the form of a structured linear database using TM-UWB repeating, complex, coded pulses.

Another feature of the present invention is the provision of providing structure to non-streaming data in a structured linear database using TM-UWB repeating, complex, coded pulses.

A further feature of the present invention is the provision of telecommunicating structured linear databases which are highly secure.

Another feature of the present invention is the provision of telecommunicating structured linear databases at high speed.

A still further feature of the present invention is the provision of a pre-packaged structured linear database for use as a telecommunication data packet.

Another feature of the present invention is the provision of using a linear database as the common platform for streaming and non-streaming data in a universal data tone system.

A still further feature of the present invention is the provision of using a structured linear database as a storage media.

It is an object of the present invention in streaming data applications to reserve a portion of the repeated, complex coded pulses for structured linear digital databases.

It is an object of the present invention to structure data in a linear digital database and concurrently transmit it utilizing TM-UWB radio telephony networks and/or fiber optic networks using TM-UWB-type repeated, complex coded pulses.

It is an object of the present invention to use TM-UWB-type repeated, complex coded pulses as a repeated, structured linear digital database in a TM-UWB radio-telephony network and/or fiber optic network.

It is an object of the present invention to use the spaces in TM-UWB and/or TM-UWB-type repeated, complex code pulses to represent digital information (0 or 1), or a neutral position.

These, as well as other features and advantages of the present invention, will become apparent from the following specification and claims.

SUMMARY OF THE INVENTION

The present invention is a comprehensive method, based on TM-UWB technology, for the secure, high speed, wireless transmission and storage of data. The present invention relates to a structured linear database which provides a common platform for simultaneous transmission of streaming and non-streaming data. This platform is designed to allow for universal data interchange between different operating systems, software applications, and electronic devices.

The present invention provides a common platform for universal data interchange, for simultaneous transmission of streaming and non-streaming data, based on time modulated ultra wideband (TM-UWB) repeating, complex, coded pulses. The present invention also provides for high-speed, secure transmission of structured linear databases over a variety of networks, either wireless and/or hard-wired.

As previously discussed, TM-UWB is a wireless technology that transmits very low power radio signals with very short pulses using very wide signal bandwidths. The pulses are transmitted at ultra precise, nearly random intervals, and frequencies to convey data using a technique called pulse position modulation. The entire TM-UWB pulse train, which may contain ten to 60 million pulses, repeats every second, or on some other regular interval. By dividing the TM-UWB pulse train into pre-determined, recognizable segments containing four basic types of divisions: 1) a routing header division; 2) LFAT (Linear File Allocation Table) division; 3) data storage and transmission division(s); and 4) a Tailbit division, a structured linear database is formed.

A unique feature of this technology is pulses are digitally independent which allow radio, TV, voice and data to be telecommunicated concurrently with the complex coded pulse stream.

The routing header division is reserved for telecommunication packet routing and protocol information, just as current telecommunication packets do.

These routing header subdivisions may used by a variety of transmission control protocols, such as but not limited to, file transfer protocol, link access protocol, balanced file transfer access method, product definition interchange format, asynchronous transfer mode, the transmission control protocol/internet protocol (TCP/IP), or the geoposition based transmission control protocol described in Attachment B of U.S. Provisional Patent Application Ser. No. 60/220,749 to Melick, et al, previously incorporated by reference.

The LFAT division is reserved and acts as an identifier that points to particular decoding templates. These templates may be one of many standard templates, or may be proprietary. These templates may be used to decode personal information, medical information, school records, manufacturing information, etc., contained in the data storage and transmission division(s) of the structured linear database. The data storage and transmission division(s) may be further subdivided. The decoding templates will identify for each subdivision in the storage and transmission division(s), the field name, field length, and the start and end position of each subdivision in the linear database. It is the combination of field names related to the position of data in each subdivision that allows for universal data interchange between different operating systems, software applications, and electronic devices.

The data storage and transmission division(s) of a structured linear database reserves pre-determined segments of a TM-UWB pulse train to act as a common platform for simultaneous use of any, or all, of the following: Internet, voice communication, radio transmission, HDTV and digital TV transmission, and/or raw data. These pre-determined segments create a "multi-channel effect" using only one repeating, complex, coded TM-UWB pulse train. These coded pulses can also be used as a new storage medium for data when the pulse positions are pre-modulated in the TM-UWB template for digital encoding. Repeating, structured linear databases are designed to become the wireless electronic link in wireless/fiber networks that seek to offer what is known in industry as data streams, digital DNA, or universal data tone.

Structured linear databases may be transmitted on fiber optic networks which are very secure, and very high speed. They may also be transmitted wireless on TM-UWB digital, impulse radio pulses which provide high security, high speed, wireless communication capabilities, or a combination of both networks. They may also be transmitted wireless on traditional radio frequency (RF) carriers, or non-fiber optic hard-wired networks, which are not as secure, or in some cases as high a transmission rate as TM-UWB.

The last subdivision in a structured linear database is reserved for a tailbit which signifies the end of a telecommunication packet, just as current telecommunication packets do.

DETAILED DESCRIPTION OF THE PREFERRED EMBODIMENT(S)

A preferred emboriment of the present invention will be described as it applies to its preferred embodiment. It is not intended that the present invention be limited to the described embodiment. It is intended that the invention cover all modifications and alternatives which may be included within the spirit and scope of the invention.

The present invention is statistically secure using repeating, complex coded pulses. It is also very high speed comprised of ten million to 60 million pulses per second. This is a repeating digital stream of pulses, with each pulse representing a 0, 1, or neutral position, within the structured linear database. A structured linear database provides for a common platform for simultaneous transmission of streaming and non-streaming data, and universal data interchange.

Figure 1:
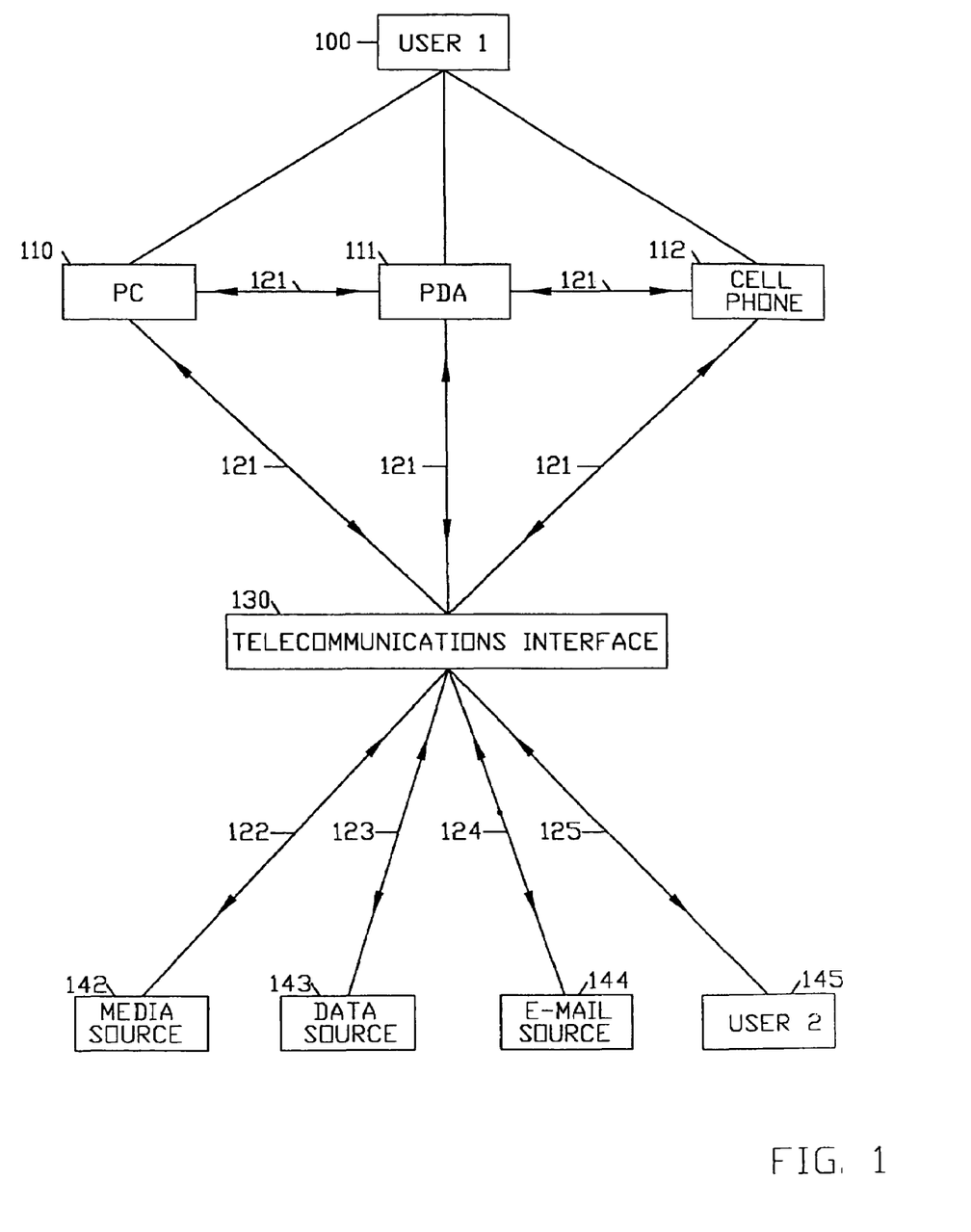
FIG. 1 is flowchart showing a method of transmitting data using a structured linear database.

Shown in FIG. 1 is a flowchart showing a method of transmitting data using a structured linear database. A person, or user 1 100 can use a structured linear database enabled device, such as PC 110, a PDA 111, or a cell phone 112, which includes simple programming instructing the devices to read incoming data as a structured linear database, commonly known as a driver program. Using a driver program with a device, User 1 100 can check their e-mail, retrieve a Word document, spreadsheet, or other electronic file, access an Internet website, listen to any radio station broadcast or any archived music, watch any TV broadcast or archived show, carry on a phone conversation, or exchange data stored within a structured linear database, etc., anytime or anywhere.

The structured linear database (LDB), according to the preferred embodiment of the present invention, provides a common platform for the simultaneous synchronous and/or non-synchronous telecommunication of streaming and non-streaming data. Streaming data is defined as the technique for transferring data such that it can be processed as a steady and continuous stream. Streaming technologies are becoming increasingly important with the growth of the Internet because most users do not have fast enough access to download large media content files quickly. With streaming data, the client browser or plug-in can start displaying the data before the entire file has been transmitted. For streaming data to work, the client side receiving the data must be able to collect the data and send it as a steady stream to the application that is processing the data and converting it to sound or pictures. This means that if the client is receiving the streaming data more quickly than required for display, it needs to save the excess data in a data buffer. If the data doesn't come quickly enough, however, the presentation of the data will not be smooth. There are a number of competing streaming technologies emerging. For audio data on the Internet, the de facto standard is Progressive Network's RealAudio. Streaming data is not limited to multimedia files, but would also include telephone conversations, live TV and radio broadcasts. Conversely, in the present invention, non-streaming data would include files such as a Microsoft Word document, or Excel spreadsheet to name a few.

LDBs are also capable of storing data as part of the repeating, complex, coded pulse train when pulse positions are pre-modulated and identified by their positions. The present invention is preferably uses a time modulated ultra wide band (TM-UWB) repeating, complex, coded pulse train. TM-UWB provides each user a personal, specific, repeating, complex, coded pulse train to transmit and receive data using a wide variety of device(s) as previously described. The specifically coded LDBs are depicted in FIG. 1 as First LDB 121, Second LDB 122, Third LDB 123, Fourth LDB 124, and Fifth LDB 125. Only one device, PC 110, PDA 111, or cell phone 112 or the telecommunications interface 130 can originate a specific structured linear database. The originating source generating a specific structured linear database is referred to as the master. All other devices, PC 110, PDA 111, or cell phone 112, or the telecommunications interface 130 are read-only, and must communicate through the master to write changes to data contained within the structured linear database.

Users, such as User 1 100 can access either a local or remote structured linear database. A User 1's 100 structured linear database enabled devices, PC 110, PDA 111, and cellphone 112 are all assigned the same First LDB 121. Locally, this allows any device, PC 110, PDA 111, or cell phone 112 assigned to user 1 100 to universally access and exchange data between each other.

The following is an example of accessing a remote data file, such as a Microsoft Word document, from data source 143, which may be a web server on which the file is stored. The devices, PC 110, PDA 111, or cell phone 112 use LDB 121 to communicate a request to a telecommunications interface 130 to access the remote data file, stored on data source 143. The telecommunications interface 130 uses header information to route the request via fiber optic, or wirelessly via TM-UWB, to access the remote data file stored on data source 143. The remote data file stored on data source 143 is telecommunicated back to a telecommunications interface 130 using the Third LDB 123 which is associated with data source 143. The telecommunications interface 130 writes the remote data file that is contained in the Third LDB 123 to the First LDB 121, which is decoded by device PC 110, PDA 111, or cell phone 112.

A TM-UWB chip integrated into device PC 110, PDA 111, or cell phone 112 is designed to telecommunicate the First LDB 121 repeating, complex, coded TM-UWB pulse structure, and to use the linear file allocation table (LFAT) contained within the First LDB 121, which is further described in Chart 1 below, to decode and interpret the data. The LFAT can also use encoded-vector indices for decision suppor and warehousing as disclosed in U.S. Pat. No. 5,706,495 to Chadha et al. which is herein incorporated by reference. The entire sequence described above can be carried out cyclically to access large files of remote streaming and/or non-streaming data.

Other sources of data use their specific LDB such as, media source 142 uses Second LDB 122, data source 143 uses Third LDB 123, e-mail source 144 uses Fourth LDB 124, and User 2 uses Fifth LDB 125 to telecommunicate data.

Chart 1 is an example of a personal structured linear database used for telecommunicating and storing streaming and non-streaming data.

Chart 1

| PULSE NUMBER (Start–End) | FIELD |
| --- | --- |
| 1 to 500 | Routing Address Header Division - Originator |
| 501 to 1,000 | Routing Address Header Division - Destination |
| 1,001 to 10,000 | Linear File Allocation Table (LFAT) Division |
| 10,001 to 30,010,000 | Data Storage and Transmission Division Comprised of: Internet Subdivisions TV Subdivisions Radio Subdivisions Voice Subdivisions Data Subdivisions Unallocated Subdivisions |
| 30,010,001 to 30,010,500 | Tailbit Division |

Note, the pulse numbers shown in Chart 1 are used for illustrative purposes only. The number of pulses in each field are reserved and dependent upon the amount of space required for that field.

In Chart 1, pulses 1 to 500 are reserved for the routing address header division of the originator. Pulses 501 to 1,000 are reserved for the routing address header division for the destination. The routing address header may use any addressing protocol, such as Internet Protocol addresses, IEEE 802 addresses.

Pulses 1,001 to 10,000 are reserved for the linear file allocation table (LFAT) division. The LFAT serves two functions.

First, the LFAT identifies the specific type of structured linear database that is being accessed. There are three basic types of structured linear databases known by the driver program, one for streaming data, one for non-streaming data, and one for combining streaming and non-streaming data. Within these three basic types there are various ways to structure the divisions depending on the use or content. As an example, in Chart 1 a standard personal structured linear database contains subdivisions for accessing the Internet, TV, radio, voice, data, and an unallocated space. Each personal structured linear database would contain the same divisions and subdivisions, each being the same length, each beginning and ending in the same space within the pulse train. The LFAT identifies any standard or proprietary structured linear database format. As a short cut, a code could be used to identify any standard type of structured linear database, or the LFAT could contain the necessary information to construct the format for any standard or proprietary structured linear database.

Second, if data is stored within the structured linear database, the LFAT will provide the decoding template to access the data in the subdivisions. As a short cut, a code could be used to identify any standard data format known by the driver program, or the LFAT could contain the necessary information to construct the data format for any standard or proprietary structured linear database. Chart 2 illustrates a typical decoding template for accessing data stored within a structured linear database. The decoding template may be on a local hard-drive, or on a network server. Each device as shown in FIG. 1, PC 110, PDA 111, or cell phone 112 would use a set of rules organized in a data interface to reformat the data automatically for display or use for each device, PC 110, PDA 111, or cell phone 112 shown in FIG. 1.

Pulses 10,001 to 30,010,000 are the data storage and transmission division reserved for streaming and non-streaming data. The subdivisions include Internet, TV, radio, voice, data, and an unallocated subdivision. The unallocated subdivision is reserved for future use. The data storage and transmission division will be subdivided into repeating, constant duration time slots. The duration of these time slots will be designed as is appropriate to take advantage of TM-UWB wireless and fiber optic transmission capabilities, and the performance of computers or other electronic devices that are enabled to use structured linear databases. However, it is important to note that structured linear databases may be carried over any wireless, or hard-wired medium. Chart 2 is an detailed example of the repeating, constant length subdivisions of the data storage and transmission division of Chart 1.

Chart 2

| PULSE NUMBER (Start–End) | FIELD |
| --- | --- |
| 10,001 to 1,000,000 | Internet subdivision |
| 1,010,001 to 2,010,000 | TV subdivision |
| 2,010,001 to 3,010,000 | Radio subdivision |
| 3,010,001 to 4,010,000 | Voice subdivision |
| 4,010,001 to 5,010,000 | Data storage subdivision |
| 5,010,001 to 6,010,000 | Unallocated subdivision |
| 6,010,001 to 7,010,000 | Internet subdivision |
| 7,010,001 to 8,010,000 | TV subdivision |
| 8,010,001 to 9,010,000 | Radio subdivision |
| 9,010,001 to 10,010,000 | Voice subdivision |
| 10,010,001 to 11,010,000 | Data storage subdivision |
| 11,010,001 to 12,010,000 | Unallocated subdivision |
| 12,010,001 to 13,010,000 | Internet subdivision |
| 13,010,001 to 14,010,000 | TV subdivision |
| 14,010,001 to 15,010,000 | Radio subdivision |
| 15,010,001 to 16,010,000 | Voice subdivision |
| 16,010,001 to 17,010,000 | Data storage subdivision |
| 17,010,001 to 18,010,000 | Unallocated subdivision |
| 18,010,001 to 19,010,000 | Internet subdivision |
| 19,010,001 to 20,010,000 | TV subdivision |
| 20,010,001 to 21,010,000 | Radio subdivision |
| 21,010,001 to 22,010,000 | Voice subdivision |
| 22,010,001 to 23,010,000 | Data storage subdivision |
| 23,010,001 to 24,010,000 | Unallocated subdivision |
| 24,010,001 to 25,010,000 | Internet subdivision |
| 25,010,001 to 26,010,000 | TV subdivision |
| 26,010,001 to 27,010,000 | Radio subdivision |
| 27,010,001 to 28,010,000 | Voice subdivision |
| 28,010,001 to 29,010,000 | Data storage subdivision |
| 29,010,001 to 30,010,000 | Unallocated subdivision |

All subdivision transmissions are started at the beginning of one of the constant duration time slots. By a rule, a subdivision transmission may be allowed to last longer than one constant duration time slot. A time division duplex scheme would be used to facilitate full duplex transmission. Methods of writing data onto a TM-UWB wireless template, or fiber optic carrier are described in U.S. Pat. Nos. 5,952,956 and 5,363,108 to Fullerton et al., and in U.S. Pat. Nos. 5,832,035, 5,812,081, 5,677,927 to Fullerton and are incorporated by reference.

When a TM-UWB signal is used to broadcast digitally encoded information in a public format in which the repeating, complex coded pulse frequency hopping scheme is known, it may be desirable and more efficient to broadcast the digitally encoded information using a differential wireless information format (DWIF). A structured linear database enabled device would be set to use the public frequency hoping sequence. In each time domain two pulses would be broadcast on the same frequency at different times. The first pulse would be the benchmark against which the second pulse's position could be compared to. As an example, if the difference in start position of the two pulses were 150 pico-seconds the value represented would be 0. Similarly, if the difference in start position of the two pulses were 300 pico-seconds the value represented would be 1. If there were no second pulse, the particular time domain would not contain any information. In this way, no decoding template would be needed to extract information contained in the structured linear database.

Pulses 30,010,001 to 30,010,500 defines a subdivision reserved for the tailbit. The tailbit signals the end of the structured linear database.

Chart 3 is an example of a decoding template used to access some of the personal data stored within one of the data storage subdivisions as shown in Chart 2.

Chart 3

| PULSE NUMBER (Start–End) | FIELD |
| --- | --- |
| 28,010,001 to 28,000,050 | First Name |
| 28,000,051 to 28,000,100 | Last Name |
| 28,000,101 to 28,000,150 | Street |
| 28,000,151 to 28,000,200 | City |
| 28,000,201 to 28,000,220 | State |
| 28,000,221 to 28,000,230 | Zip Code |
| 28,000,231 to 28,000,250 | Home Telephone |
| 28,000,251 to 28,000,300 | E-mail Address |
| 28,000,301 to 28,000,350 | Birth Date |

Note, the pulse numbers shown in Chart 2 are used for illustrative purposes only. The number of pulses in each field are reserved and dependent upon the amount of space required for that field.

Chart 3 is an example of some personal information stored within a data storage subdivision of a personal structured linear database that may decoded using this template. It is very important to note, by using this decoding template contained within a structured linear database, any enabled device that is configured to use LDB 121, as shown in FIG. 1, can access data directly contained within the structured linear database.

Other types of personal information may include, but are not limited to medical records, financial records, a digital image of the user, etc.

Chart 4 is an example of a proposed standardized data transmission and storage decoding template to access business data stored within a structured linear database.

Chart 4

| PULSE NUMBER (Start–End) | FIELD |
| --- | --- |
| 1,000,001 to 1,000,050 | First Record No. |
| 1,000,051 to 1,000,100 | Customer |
| 1,000,101 to 1,000,150 | Customer Order No. |
| 1,000,151 to 1,000,200 | Shop Order No. |
| 1,000,201 to 1,000,220 | Part No. |
| 1,000,221 to 1,000,250 | Lot No. |
| 1,000,251 to 1,000,270 | Quantity Due |
| 1,000,271 to 1,000,300 | Due Date |
| 1,000,301 to 1,005,000 | Certifications |
| 1,005,001 to 1,007,000 | Shipping Instructions |

-continued

| PULSE NUMBER (Start–End) | FIELD |
|---|---|
| 1,007,001 to 1,007,050 | Second Record No. |
| 1,007,051 to 1,007,100 | Customer |
| 1,007,101 to 1,007,150 | Customer Order No. |
| 1,007,151 to 1,007,200 | Shop Order No. |
| 1,007,201 to 1,007,220 | Part No. |
| 1,007,221 to 1,007,250 | Lot No. |
| 1,007,251 to 1,007,270 | Quantity Due |
| 1,007,271 to 1,007,300 | Due Date |
| 1,007,301 to 1,012,000 | Certifications |
| 1,012,001 to 1,014,000 | Shipping Instructions |
| 1,014,000 to (1,000,001 + N × 7000) | Third Record No. Through "N" Record No. Customer Customer Order No. Shop Order No. Part No. Lot No. Quantity Due Due Date Certifications Shipping Instructions |

Note, the pulse numbers shown in Chart 4 are used for illustrative purposes only. The number of pulses in each field are reserved and the actual number of pulses present is dependent upon the amount of space required for that field.

Chart 4 details a linear structure for repeating data that typically resides in a relational database. A standard relational database stores data in a two-dimensional array. A structured linear database can store the same data in a repeating, one-dimensional, pre-packetized format. In a structured linear database that is formatted for storing and accessing repeating data fields, the decoding template identifies the following information required to decode the data:

1) The field name of each subdivision for a single record
2) The pulse start and end position for each field name in the linear database for a single record Mathematically, the pulse positions and corresponding field names for all remaining records can be determined.

Extensible Markup Language (XML for short) is a computer language designed to make information self-describing by adding tags or identifiers to each piece of data. A structured linear database accomplishes the same objective XML does by a different method, information becomes self-describing when its data is decodable by its position in a structured linear database.

The unifying power of XML arises from a few well-chosen rules. One is that tags almost always come in pairs. Like parentheses, they surround the text to which they apply. And like quotation marks, tag pairs can be nested inside one another to multiple levels.

The nesting rule automatically forces a certain simplicity on every XML document, which takes on the structure known in computer science as a tree. As with a genealogical tree, each graphic and bit of text in the document represents a parent, child or sibling of some other element; relationships are unambiguous. Trees cannot represent every kind of information, but they can represent most kinds that we need computers to understand. Trees, moreover, are extraordinarily convenient for programmers. If your bank statement is in the form of a tree, it is a simple matter to write a bit of software that will reorder the transactions or display just the cleared checks.

It is very important to note, by using a decoding template contained within a structured linear database, any enabled device can access data directly contained within the structured linear database whether or not that data is tagged. When structured linear databases are used specifically for universal data interchange, the LFAT, which is used to decode data contained in the structured linear database, can in some cases supplant XML (Extensible Markup Language), and in most cases enhance XML because the need to tag each individual data element is no longer required.

In a fiber optic/TM-UWB network there is a problem of generating, storing, and telecommunicating the repeating, complex coded pulse structure that can be digitally encoded using the principle of pulse position modulation (advancing and retarding a pulse's expected position in time to represent binary coded information). Since fiber optic and TM-UWB networks are extremely secure and have a very high speed, it would be efficient to tag each pulse with its TM-UWB start position and broadcast frequency. While this may be extraneous information on fiber, it eliminates the need for complicated computing and the extra telecommunications required to set up the repeating, complex coded pulse structure, so that a structured linear database can be transmitted and received at wireless points of presence. By knowing a pulse's start position and detecting its encoded position, the decoding can be accomplished mathematically without writing a separate template. The following chart is an example of a tagged, wireless broadcast formatted (TWBF) pulse which uses two sixteen bit tags. The first tag is for the pulse's start position, and the second tag is for the broadcast frequency.

| FORMAT | PULSE START POSITION | BROADCAST FREQUENCY | PULSE POSTION MODULATED PULSE |
|---|---|---|---|
| Digital | 001100011010010 | 110010011001 | Neutral, 0, or 1 |
| Base 10 | 6354 | 3225 | Neutral, 0, or 1 |

In this example, the numeric value for the pulse start position could be the actual start position in distance from the beginning of each time domain, or could be used to drive the following algorithm to determine the pulse start position:

START TIME OF PULSE POSITION BROADCAST= (PULSE START POSITION VALUE)× (DISTANCE FACTOR)

The broadcast frequency numeric value is used to drive a look-up table that relates to the value of the actual broadcast frequency. As an example, the numeric value for the broadcast frequency in Chart 1 of 3225 would equate to an actual broadcast frequency of 8.325 GHz.

If the master template is always generated on fiber, the tagged wireless broadcast format information could be stripped from the TM-UWB wireless link telecommunication packet. This would allow more relevant data to be broadcast wirelessly to a structured linear database enabled device.

When a TM-UWB signal is used to broadcast digitally encoded information in a public format in which the repeating, complex coded pulse frequency hopping scheme is known, it may be desirable and more efficient to broadcast the digitally encoded information using a differential wireless information format (DWIF). A structured linear database enabled device would be set to use the public frequency hoping sequence. In each time domain two pulses would be broadcast on the same frequency at different times. The first pulse would be the benchmark against which the second pulse's position could be compared to. As an example, if the difference in start position of the two pulses were 150 pico-seconds the value represented would be 0. Similarly, if the difference in start position of the two pulses were 300 pico-seconds the value represented would be 1. If there were no second pulse, the particular time domain would not contain any information. In this way, no decoding template would be needed to extract information contained in the structured linear database.

A structured linear database enabled device can perform all the functions of a Bluetooth enabled device, and even better than the following important operational features. A structured linear database enabled device will have a greater range of several kilometers vs. the maximum range of 100 meters for a Bluetooth enabled device. A structured linear database enabled device will be capable of performing both short and long range wireless functions into one technology. A structured linear database enabled device will be able to telecommunicate data at speeds of ten to 60 Mb/sec vs. the maximum speed of 732 kb/sec for a Bluetooth enabled device. A structured linear database is self-encrypting vs. the need for a Bluetooth enabled device to intentionally scramble and descramble data. A structured linear database is self-authenticating. And finally a structured linear database is built on a single layer protocol vs. the more complicated multi-layer protocol of Bluetooth.

Another implication of structured linear databases is they provide a means for an open e-mail format. As described earlier, structured linear databases enabled devices use a set of rules organized in a data interface to reformat the data that is contained with the structured linear database automatically for display, or use by each enabled device. As an example, Microsoft Outlook98's e-mail interface only provides for the following significant information:

1) TO:
2) CC:
3) BC:
4) SUBJECT:

All other information is text based and insignificant.

The following is an example of a simple hotel bill which will demonstrate the power of a structured linear database using a "e-mail type" data interface. Any structured linear database enabled device will be able to create, code, "e-mail", decode, and display the following significant information:

1) TO:
2) ADDRESS:
3) PHONE
4) FROM:
5) DATE OF ARRIVAL:
6) DATE OF DEPARTURE:
7) LIST OF CHARGES
8) ROOM NO.
9) CAR TYPE
10) CAR LICENSE NO.
11) CREDIT CARD TYPE
12) CREDIT CARD NO.
13) EXPIRATION DATE

Once received, the customer could dynamically use the information to complete a travel expense report for his company's accounting department, etc., by accessing the data as known stored "e-mail type" data.

Structured linear databases eliminate the need for separate e-mail servers, and allow for a wide variety of new standard and custom e-mail formats to be designed. The information contained in the e-mail will be significant.

Warranties, any bill, contracts, could all be e-mailed to a customer's structured linear database where they would reside as part of a user's personal data stream within a structured linear database.

Other benefits of patents related to linear databases include:

1) Self-routing telecommunications
2) Faster computing speeds
3) Faster telecommunication speeds
4) Fewer computing errors
5) Fewer telecommunication errors
6) New number base for digital computing
7) New number base for digital telecommunication A general description of the present invention as well as a preferred embodiment of the present invention has been set forth above. Those skilled in the art to which the present invention pertains will recognize and be able to practice additional variations in the methods and systems described which fall within the teachings of this invention.

Accordingly, all such modifications and additions are deemed to be within the scope of the invention which is to be limited only by the claims appended hereto.

What is claimed is:

1. An electronically implemented method of transmitting data between a device and a communications channel interface, comprising:
communicating a request for the data from the device to the communications channel interface;
determining a type of data being requested;
accessing the data within a communications channel by the communications channel interface using a communication protocol that defines a position of the data within a structured linear database based on the type of data being requested;
transmitting the data from the communications channel interface to the device and wherein the structured linear database protocol uses at least one structured linear database comprising a linear file allocation table including a field name for one or more subdivisions of data, pulse start and end position information for each of the field names.

2. The method of transmitting data between a device and a communications channel interface of claim 1 wherein the step of transmitting is transmitting using radio frequency over a hard-wired medium.

3. The method of transmitting data between a device and a communications channel interface of claim 1 wherein the step of transmitting is transmitting using a radio frequency system over a wireless medium.

4. The method of transmitting data between a device and a communications channel interface of claim 1 wherein the step of transmitting is transmitting using an ultra wideband radio frequency system over a hard-wired medium.

5. The method of transmitting data between a device and a communications channel interface of claim 1 wherein the step of transmitting is transmitting using an ultra wideband radio frequency system over a wireless medium.

6. The method of transmitting data between a device and a communications channel interface of claim 5 wherein the ultra wideband radio frequency transmission system uses variable pulse characteristics to represent data.

7. The method of transmitting data between a device and a communications channel interface of claim 5 wherein the ultra wideband radio frequency transmission system uses variable spaces between pulses to represent data.

8. The method of transmitting data between a device and a communications channel interface of claim 1 wherein the step of transmitting is transmitting using a fiber optic medium.

9. The method of transmitting data between a device and a communications channel interface of claim 1 wherein the step of accessing data with the linear database protocol is accessing data based on pulse position information associated with the type of data being requested.

10. The method of transmitting data between a device and a communications channel interface of claim 1 wherein the data includes streaming data.

11. The method of transmitting data between a device and a communications channel interface of claim 1 wherein the data includes non-streaming data.

12. The method of transmitting data between a device and a communications channel interface of claim 1 wherein the at least one structured linear database contains at least one telecommunication data packet.

13. The method of transmitting data between a device and a communications channel interface of claim 1 wherein the structured linear database protocol uses a plurality of structured linear databases.

14. The method of transmitting data between a device and a communications channel interface of claim 1 wherein the structured linear database contains a plurality of telecommunication data packets.

15. The method of transmitting data between a device and a communications channel interface of claim 1 wherein the structured linear database is variable in length.

16. The method of transmitting data between a device and a communications channel interface of claim 1 wherein the telecommunication data packets are variable in length.

17. The method of transmitting data between a device and communications channel interface of claim 1 wherein one structured linear database is equivalent in duration to one telecommunication data packet.

* * * * *